US007729555B2

(12) United States Patent
Chen et al.

(10) Patent No.: US 7,729,555 B2
(45) Date of Patent: Jun. 1, 2010

(54) VIDEO NOISE REDUCTION METHOD USING ADAPTIVE SPATIAL AND MOTION-COMPENSATION TEMPORAL FILTERS

(75) Inventors: Chao-Ho Chen, Tai-Nan (TW); Ming-Kun Wu, Kaohsiung County (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 808 days.

(21) Appl. No.: 11/623,098

(22) Filed: Jan. 15, 2007

(65) Prior Publication Data
US 2007/0195199 A1  Aug. 23, 2007

Related U.S. Application Data

(60) Provisional application No. 60/766,976, filed on Feb. 22, 2006.

(51) Int. Cl.
G06K 9/40  (2006.01)
G06K 9/38  (2006.01)
H04N 5/217  (2006.01)
H04N 5/00  (2006.01)

(52) U.S. Cl. .................. 382/261; 382/260; 382/271; 382/272; 348/241; 348/606; 348/607

(58) Field of Classification Search ......... 382/260–265, 382/271, 272; 348/241, 606, 607
See application file for complete search history.

(56) References Cited

U.S. PATENT DOCUMENTS 4,344,158 A   8/1982  Landrum, Jr.
6,281,942 B1 *  8/2001  Wang .................... 348/607
6,630,961 B1  10/2003  Shin
7,203,378 B2 *  4/2007  Chiu .................... 382/260
7,369,181 B2 *  5/2008  Kang et al. .............. 348/606
7,602,987 B2 * 10/2009  Kuramoto ................ 382/254

FOREIGN PATENT DOCUMENTS

| EP | 1 585 343 A2 | 10/2005 |
|---|---|---|
| JP | 4249412 | 9/1992 |
| JP | 662284 | 3/1994 |
| KR | 20010087949 | 9/2001 |
| TW | I227632 | 2/2005 |
| TW | I235007 | 6/2005 |

* cited by examiner

Primary Examiner—Vu Le
Assistant Examiner—Soo Jin Park
(74) Attorney, Agent, or Firm—Winston Hsu

(57) ABSTRACT

A method includes calculating a mean of a plurality of pixels of a motion window, calculating a pixel amount of pixels similar to a center pixel, calculating a variance of the pixels, determining whether a difference between the center pixel and the mean is greater than a first predetermined value, determining whether the pixel amount similar to the center pixel is greater than a second predetermined value if the difference between the center pixel and the mean is not greater than the first predetermined value, determining whether the variance is smaller than a threshold value if the pixel amount similar to the center pixel is not greater than the second predetermined value, and filtering the center pixel according to a result of determining whether the variance is smaller than the threshold value. Finally, temporal weighted mean filters involving motion estimation are used for motion compensation in images after spatial filtering.

7 Claims, 4 Drawing Sheets

| | Peak-Signal-to-Noise Ratio (PSNR)(dB) | | |
|---|---|---|---|
| | Gaussian Noise | Fixed-value impulse noise | Random-value impulse noise |
| Video α-trimmed mean filter | 23.20 | 22.44 | 22.79 |
| Video K-NN filter | 24.89 | 21.17 | 22.97 |
| Data-dependent weighted average filter (DDWA) | 25.15 | 11.72 | 16.98 |
| ASF filter | 24.50 | 13.89 | 21.22 |
| Filters provided in the present invention | 26.25 | 26.86 | 24.13 |
| Improvement rate PSNR-IR(%) | 7.46 | 54.04 | 16.10 |

Fig. 4

VIDEO NOISE REDUCTION METHOD USING ADAPTIVE SPATIAL AND MOTION-COMPENSATION TEMPORAL FILTERS

CROSS REFERENCE TO RELATED APPLICATIONS

This application claims the benefit of U.S. Provisional Application No. 60/766,976, filed Feb. 22, 2006, and included herein by reference.

BACKGROUND OF THE INVENTION

1. Field of the Invention

The present invention relates to a video noise reduction method, and more particularly, to a video noise reduction method using adaptive spatial and motion-compensation temporal filters.

2. Description of the Prior Art

In an era of multimedia communication, image data is playing an important role. But no images are absolutely perfect no matter how good a camera is, since images are interfered with by the presence of noise. The principal sources of noise in digital images arise during image acquisition (digitization) and/or transmission. The performance of imaging sensors is affected by a variety of factors, such as environmental conditions during image acquisition, and by the quality of the sensing elements themselves. For instance, in acquiring images with a CCD camera, luminosity and sensor temperature are major factors affecting the amount of noise in the generated images. Images are corrupted during transmission principally due to interference in channels used for transmission. For example, an image transmitted by a wireless network might be disturbed as a result of lightning or other atmospheric charged particles. In addition, due to a sensing element with one pixel consisting of a transistor, instability of the transistor will always cause the sensing element a permanent or transient failure. That is so-called transient noise and permanent noise in image sequences.

Image sequences are often corrupted by noise in different production ways, such as a bad reception of television pictures. In the recent years, a number of nonlinear techniques for video processing have been proposed, which are known as superior to linear techniques. These algorithms are necessary, since the presence of noise in an image sequence degrades both its visual quality, as well as, the effectiveness of subsequent processing tasks. For example, the coding efficiency obtained for a particular image sequence is decreased by the presence of noise. This entropy of the image sequence is increased obviously by the noise. Therefore, filtering methods for reducing noise are desired not only to improve the visual quality, but also to increase the performance of subsequent processing tasks such as coding, analysis, or interpretation.

As for discussing temporal noises, noises are divided into three categories which including permanent noise, temporary transient noise, and temporary intermediate noise. Their features are described as follows:

1. Permanent Noise:

This kind of noise arose from the failures of the image sensors. It is generally caused by flaws in the manufacture of transistors, so the permanent noise always appears at the same locations in images.

2. Temporal Transient Noise:

The characteristics of this kind of noise are that pixels are interfered by noise in some frames but are not interfered by noise in some frames. The main reason is due to interferences by external environment or due to instability of sensing elements.

3. Temporal Intermediate Noise:

The characteristics of this kind of noise are that pixels are interfered by noise in the current frame, but are not interfered by noise in the next frame. Then pixels are interfered by noise in the next following frames again. This action is run alternately. The main reason is caused by external environment factors.

Generally, temporal video noise reduction filters are divided into four primary kinds:

1. Non-Motion Compensated Spatiotemporal Filtering:

Many of the non-motion compensated spatiotemporal filtering approaches used in the present day are developed from well-known 2D filtering techniques.

2. Motion Compensated Spatiotemporal Filtering:

To take full advantage of the temporal correlations that exist in an image sequence, explicit motion estimation and compensation have been used in a separate step or simultaneously with the filtering of the image sequence. From a filter design point of view, the addition of motion compensation to a non-motion compensated filter does not result in a new filter. However, it does improve the temporal correlation, which improves performance of the filter.

3. Non-Motion Compensated Temporal Filtering:

Due to the lack of robust motion estimators, early attempts at temporally filtering image sequences were restricted to simple frame average techniques. Although the temporal correlations are considered in this method, but the possibility of object motions are not considered. Therefore, there are residual images or fuzzy phenomenon appeared when an object moves.

4. Motion Compensated Temporal Filtering:

The method can avoid problems associated with non-motion compensated temporal filtering.

In general, higher visibility thresholds will occur in either very dark regions or very bright regions of pictures, and lower visibility thresholds will occur in medium to dark-gray regions. It was found that human visual perception is sensitive to luminance contrast rather than absolute luminance values. The ability of human eyes to detect differences between an object and its background, known as contrast sensitivity, is dependent upon the average value of background luminance. According to Weber's law, if the luminance of a test stimulus is just noticeable from the surrounding luminance, the ratio of just noticeable luminance difference to stimulus luminance, known as Weber fraction, is approximately a constant. However, in a real situation, due to the presence of ambient illumination or TV monitor characteristics, noise in dark areas tends to be less visible than that in regions of high luminance. Therefore, the modification has been made that, as the background luminance is low, the Weber fraction increases as the background luminance decreases.

The just noticeable difference (JND) is the ability of human eyes to distinguish luminance variation. A JND model we quote is presented by Chou and is described by the following expressions:

$$JND(g(x,y)) = \begin{cases} T_0 \times \left(1 - \sqrt{\frac{g(x,y)}{127}} + h_1\right), & g(x,y) \leq 127 \\ \gamma \times (g(x,y) - 127) + h_2, & \text{otherwise} \end{cases};$$

where g(x,y) denotes a gray-level value of a pixel located at a position (x,y), and JND(g(x,y)) is its JND value of the pixel. According to experiment data of our present invention, $h_1=23$, $h_2=23$, $T_o=11$ and $\gamma=7/128$ will be more suitable for human visual perception on a video.

Noise can be added to still images or video sequences in various steps such as image acquisition, recording, and transmission. Then the results of post-processing tasks are also influenced by noise. As a result, noise reduction is important for video processing. For video-noise filtering, it may cause object-overlapped phenomenon in an image frame due to the occlusion problem when the spatial-filtering is only used, excluding the temporal-filtering. Oppositely, the image may be blurred and even the noise cannot be filtered if the temporal-filtering is only performed but spatial characteristics of the image are not utilized. Therefore, for removing noise correctly, a video-noise filter should be able to work on both temporal and spatial domains.

Continuous pictures in temporal domain form a motion of humans or objects. This characteristic is used in motion compensated methods to reduce redundancy in temporal domain. As for the current pictures, image areas that are the same as the corresponding areas in the previous pictures will not be transmitted to decrease data transmission. Searching similar areas between different pictures is so-called "motion estimation". Displacements used for representing motion degree are called "motion vector".

Applications of reducing video noise are already disclosed by some scholars.

For example, two non-motion compensated spatiotemporal filters are provided, a Video α-trimmed mean filter and a K nearest neighbor image sequence filter. Therefore, there are residual images or fuzzy phenomenon appearing when an object moves due to motion estimation not being used to detecting whether an object is moving or not.

In another reference document, a temporal filter (an adaptive motion compensated frame averaging) utilizing motion compensation is provided. This method is based on blocks and switched between simple frame averaging and motion compensated frame averaging to reduce video noise, which is one kind of the motion compensated temporal filters. This may blur outline edges of image after filtering noise due to problems of spatial outline edges of image, permanent noise, and temporary transient noise are not considered.

In addition, a method of adding motion compensation into a non-motion compensated filter is provided. The method includes three steps to reduce video noise: spatial filtering, motion compensation, and temporal filtering. The method of work of the spatial filtering is keeping information of edges and details of each frame and using a data-dependent weighted average filter (DDWA) to accomplish this step. The spatial filtering is added due to noise interference affecting accuracy of motion estimation. However, the output of the front end cannot reduce noise sufficiently, Boyce's detector are used for motion compensation.

In another reference document, only spatial information is used to reduce video noise, noise in temporal domain cannot be reduced.

Thus it can be seen, there is residual image phenomenon appearing when objects move if only spatial filters are used to reduce noise without considering temporal correlations. There is temporary transient noise appearing in outline edges of image and outline edges of an image may be blurred, if only temporal filters are used to reduce noise without considering spatial correlation. In order to reduce noise correctly, a video filter has to work both in the spatial and temporal domains. A method provided in the prior art reference document considers both characteristics in the spatial and temporal domains, but is applied to reduce Gaussian noise only but not to reduce impulse noise effectively.

SUMMARY OF THE INVENTION

The claimed invention provides a video noise reduction method using adaptive spatial and motion-compensation temporal filters. The method includes calculating a mean of a plurality of pixels of a motion window, calculating a pixel amount of pixels that are similar to a center pixel in the motion window, calculating a variance of the plurality of pixels of the motion window, determining whether a difference between a pixel value of the center pixel and the mean is greater than a first predetermined value, determining whether the pixel amount of pixels that are similar to the center pixel in the motion window is greater than a second predetermined value if the difference between the pixel value of the center pixel and the mean is not greater than the first predetermined value, determining whether the variance is smaller than a threshold value if the pixel amount of pixels that are similar to the center pixel in the motion window is not greater than the second predetermined value, filtering the center pixel of the motion window according to a result of determining whether the variance is smaller than the threshold value, and using a temporal weighted mean filter involving motion estimation for motion compensation in images. The method further includes filtering a current frame by using the motion window to generate a filtered frame, estimating motion vectors of the moving objects of the current frame in several previous frames according to the filtered frame and the several previous frames, estimating motion vectors of the moving objects of the current frame in several following frames according to the filtered frame and the several following frames, and removing residual images of the filtered frame according to the motion vectors of the moving objects of the current frame in the several previous frames, the motion vectors of the moving objects of the current frame in the several following frames, and the filtered frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram comparing peak signal to noise ratio in the prior art with in the present invention.

DETAILED DESCRIPTION

Some concepts of the present invention have already been published in the proceedings of conference, as described below: (Thou-Ho (or Chao-Ho) Chen), Chao-Yu Chen and Tsong-Yi Chen, "An Intelligent Video Noise Reduction Method Using Adaptive Spatial and Motion-Compensation Temporal Filters", 2006 IEEE International Conference on Cybernetics&Intelligent Systems (CIS), Bangkok, Thailand, Jun. 7-9, 2006. (pp. 341-346).

The present invention provides a video reduction method using adaptive spatial and motion-compensation temporal filters. The present invention can be seen in several levels. The first introduces approximated motion compensated spatiotemporal filtering. The next is an algorithm introducing a temporal filter for reducing noise and related filters. Finally, temporal relationships of a video, correct motion estimation, and compensation of image sequences after spatial filtering are fully employed. The temporal relationships can be improved due to motion compensation is considered, and going a step further, the efficiency of filters are improved.

Figure 1:
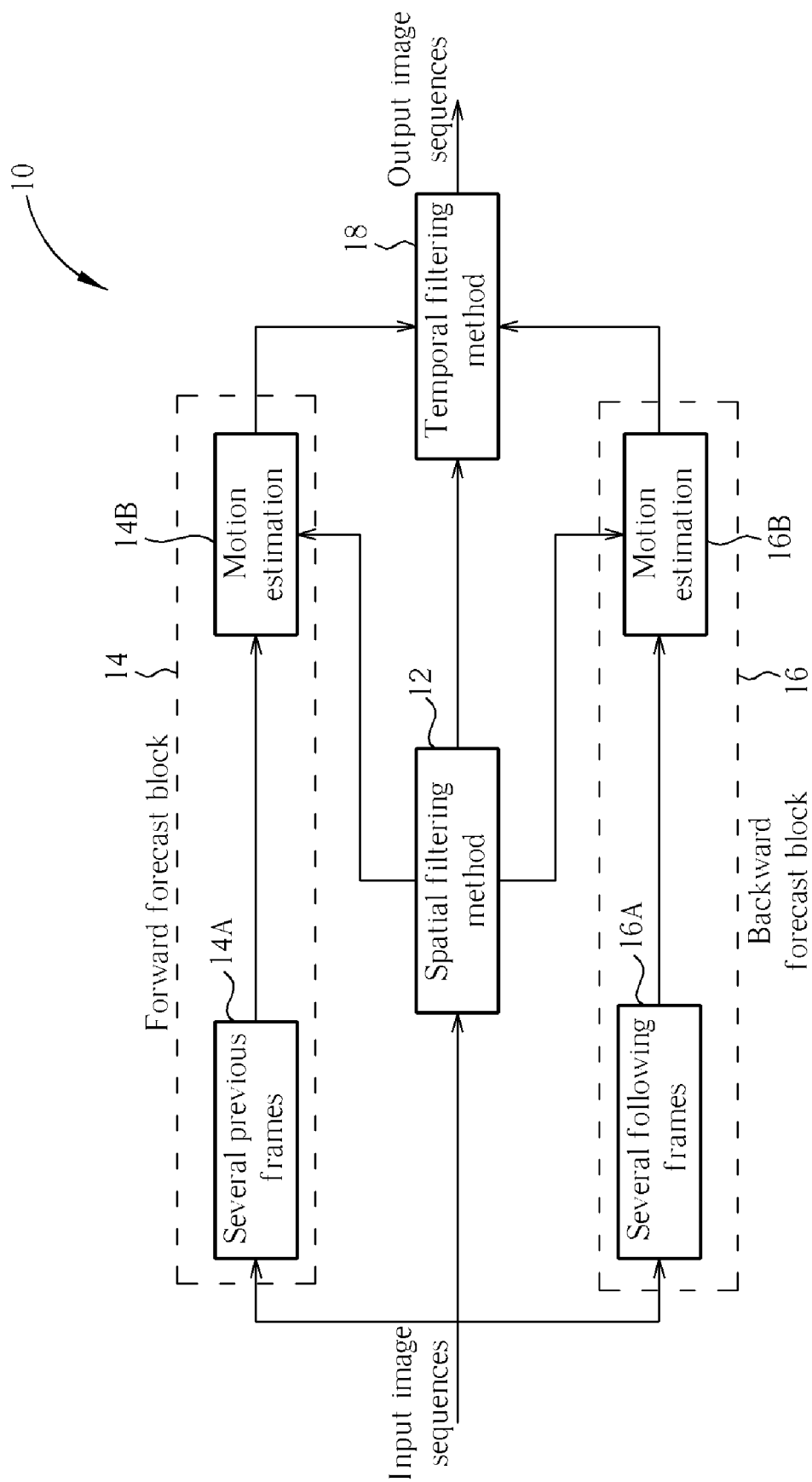
FIG. 1 is a block diagram illustrating a video noise reduction algorithm using adaptive spatial and motion-compensation temporal filters according to an embodiment of the present invention.

Please refer to FIG. 1. FIG. 1 is a block diagram illustrating a video noise reduction algorithm 10 using adaptive spatial and motion-compensation temporal filters according to an embodiment of the present invention. The video noise reduction algorithm 10 can be divided into several parts: a spatial filtering method 12, a forward forecast block 14, a backward forecast block 16, and a temporal filtering method 18. In the spatial filtering method 12, image area characteristics and characteristics visible to the human eye are used for determining relationships in spatial domain to decide whether interference by noise is present or not and for estimating an original pixel value. In the forward forecast block 14, a motion estimation method 14B is utilized to find the best matching block with the current frame in several previous frames 14A before the current frame. In the backward forecast block 16, a motion estimation method 16B is used to find the best matching block with the current frame in several following frames 16A after the current frame. The current block found in the temporal filtering method 18, and the two blocks found in the forward forecast block 14 and in the backward forecast block 16 are inputted into the temporal filtering method 18 to determine relationship in temporal domain to estimate original pixel values and output image sequences after reducing noise.

Figure 2:
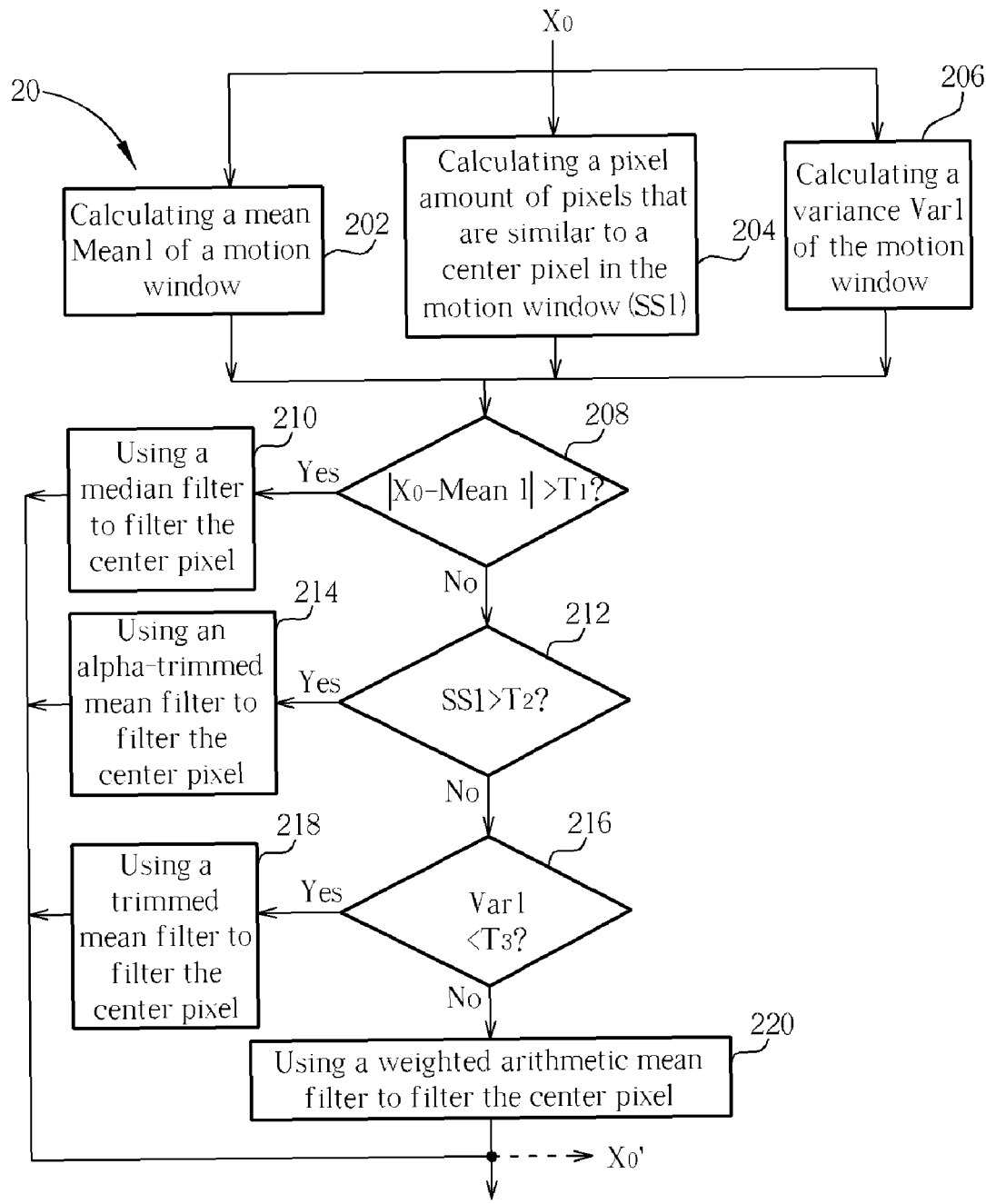
FIG. 2 is a diagram of a flow illustrating a video noise reduction algorithm in spatial filtering according to an embodiment of the present invention.

Please refer to FIG. 2. FIG. 2 is a diagram of a flow chart 20 illustrating a video noise reduction algorithm in spatial filtering according to an embodiment of the present invention. The flow chart 20 includes the following steps:

Step 202: Calculating a mean Mean1 of a plurality of pixels of a motion window.

Step 204: Calculating a pixel amount of pixels that are similar to a center pixel $X_0$ in the motion window (SS1).

Step 206: Calculating a variance Var1 of a plurality of pixels of the motion window.

Step 208: Determining whether a difference between a pixel value of the center pixel $X_0$ and the mean Mean1 is greater than a first predetermined value $T_1$.

Step 210: Using a median filter to filter the center pixel $X_0$.

Step 212: Determining whether the pixel amount of pixels SS1 that are similar to the center pixel $X_0$ in the motion window is greater than a second predetermined value $T_2$.

Step 214: Using an alpha-trimmed mean filter to filter the center pixel $X_0$.

Step 216: Determining whether the variance Var1 is smaller than a threshold value $T_3$ or not.

Step 218: Using a trimmed mean filter to filter the center pixel $X_0$.

Step 220: Using a weighted arithmetic mean filter to filter the center pixel $X_0$.

In step 208, choosing to use the median filter to filter the center pixel $X_0$ (step 210) or to process the next judgment step (step 212) according to a result of determining whether a difference between a pixel value of the center pixel $X_0$ and the mean Mean1 is greater than a first predetermined value $T_1$ is decided, where the first predetermined value $T_1$ is set as $T_1=\alpha*JND(x_0)$ in the present invention. In step 212, choosing to use the alpha-trimmed mean filter to filter the center pixel $X_0$ (step 214) or to process the next judgment step (step 216) according to a result of determining whether the pixel amount of pixels SS1 that are similar to the center pixel $X_0$ in the motion window is greater than a second predetermined value $T_2$ is decided. In step 216, choosing to use the trimmed mean filter (step 218) or the weighted arithmetic mean filter (step 220) to filter the center pixel $X_0$ according to a result of determining whether the variance Var1 is smaller than a threshold value $T_3$ or not is decided.

Furthermore, how a median filter, an alpha-trimmed mean filter, a trimmed mean filter, and a weighted arithmetic mean filter to reduce noise is introduced in the following.

1. Median Filter:

The most famous sort statistics filter is a median filter that utilizes the median value of adjacent pixels to replace a pixel value of the center pixel and can be expressed as $Y=\text{median}\{x_i|x_i\in W\}$. The median filter provides perfect noise reduction capability to certain kinds of random noises and generates clearer images than linear smooth filters with the same size. The median filter performs well especially when dipole impulse noises and single pole impulse noises appear at the same time. In the approach of the present invention, the median filter is used for filtering fixed-value impulse noises.

2. Alpha-Trimmed Mean Filter:

The equation of the alpha-trimmed mean filter is expressed as $$Y \equiv \frac{1}{n^2-d} \sum_{x_i \in W_d} x_i.$$

As regards "d" in different values, the alpha-trimmed mean filter is useful in conditions involved in multiform noises (such as combination of pepper noise or Gaussian noise). In the approach of the present invention, the alpha-trimmed mean filter is used for filtering the Gaussian noise and the impulse noise that have few pixel amount of pixels that are similar to the center pixel in the motion window.

3. Trimmed Mean Filter:

The equation of the trimmed mean filter is expressed as $$Y \equiv \frac{n^2}{\sum_{x_i \in W} \frac{1}{x_i}}.$$

The trimmed mean filter performs well when dealing with the salt noise but not with the pepper noise. It also works well when dealing with noises of other types, for example, the Gaussian noise. In the approach of the present invention, the trimmed mean filter is used for filtering the Gaussian noise with low variance.

4. Weighted Arithmetic Mean Filter:

The equation of the weighted arithmetic mean filter is expressed as $$Y \equiv \frac{\sum_{i=1}^{n^2-1} c_i * x_i}{\sum_{i=1}^{n^2-1} c_i}.$$

Wherein, $c_i$ is a weighted value of each pixel in a motion window. According to our experimental data, the weighted value of each pixel $c_i$ is specified as:

$$c_i \equiv \begin{cases} 64 & \text{if } |x_0 - x_i| < Th1 \\ 16 & \text{if } |x_0 - x_i| < Th2 \\ 4 & \text{if } |x_0 - x_i| < Th3 \\ 1 & \text{if } |x_0 - x_i| \geq Th4 \end{cases};$$

$$\text{where } \begin{cases} Th1 = 1.5 \times JND(x_0) \\ Th1 = 2 \times JND(x_0) \\ Th3 = 3.5 \times JND(x_0) \end{cases}.$$

The weighted arithmetic mean filter is used for filtering the Gaussian noise with high variance.

Figure 3:
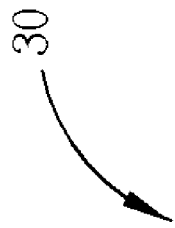
FIG. 3 is a diagram of a motion window.

Please refer to FIG. 3. FIG. 3 is a diagram of a motion window 30. The motion window 30 is a motion window of a 5×5 size, where a center pixel $X_0$ is located right in the centre of the motion window 30. The motion window 30 further includes 24 pixels $X_1$-$X_{24}$.

Finally, the present invention utilizes Boyce's motion estimation method to do motion estimation and motion compensation in images after spatial filtering. The best matching block can be found in each block based on the mean absolute difference (MAD). The mean absolute difference with the best replacement matching is called $MAD_{min}$. In order to get the best motion vector, calculating the MAD value of the current block at the same location in other frames is called $MAD_0$. The value $MAD_{min}$ and $MAD_0$ can be expressed in the following equations:

$$MAD_{mini,j} = \min d_1, d_2 \frac{1}{N_1 N_2} \sum_{n_1} \sum_{n_2} |f_i(n_1, n_2) - f_j(n_1 - d_1, n_2 - d_2)|;$$

$$MAD_{0i,j} = \frac{1}{N_1 N_2} \sum_{n_1} \sum_{n_2} |f_i(n_1, n_2) - f_j(n_1, n_2)|;$$

Wherein, (N1, N2) represents a size of a motion block, (n1, n2) represents the location, (d1, d2) represents the motion vector, and fi represents the inputted frame.

In order to lower fuzzy phenomenon appearing in spatial filtering, a temporal weighted mean filter is provided in the present invention and can be expressed in the following:

$$Y = \frac{1}{2 + k1 + k2} \left( 2 * xi + \sum_{j=1}^{k1} x_{i-j} + \sum_{j=1}^{k2} x_{i+j} \right);$$

where Y is a pixel value of a center pixel of the filtered frame after removing residual images, K1 is a frame amount of the several previous frames, K2 is a frame amount of the several following frames, Xi is the pixel value of the center pixel of the filtered frame before removing residual images, Xi–j is the pixel value of the center pixel of the several previous frames, and $X_{i+j}$ is the pixel value of the center pixel of the several following frames.

Please refer to FIG. 4. FIG. 4 is a diagram comparing peak signal to noise ratio (PSNR) in the prior art with in the present invention. In this embodiment, a Gaussian noise with standard difference 20, a fixed-value impulse noise with 20%, and a random-value impulse noise with 20% is added to a gray scale image sequence. The improvement ratio PSNR-IR is obtained from the following equation:

$$PSNR - IR \equiv \frac{PSNRour - PSNRavg4}{PSNRavg4} \times 100\%;$$

where $PSNR_{our}$ is the PSNR value of the present invention, and $PSNR_{avg4}$ is the mean of the PSNR value of other four filters. The video α-trimmed mean filter and the video K-NN filter are spatiotemporal filters provided by V. Zlokolica, W. Philips, and D. Van De Ville. The data-dependent weighted average filter is a spatiotemporal filter provided by M. Meguro, A. Taguchi and N. Hamada. The ASF filter is a spatiotemporal filter provided by Young Huang and Lucas Hui.

The above-mentioned embodiments illustrate but do not limit the present invention. The parameters mentioned above, for example, the first predetermined value $T_1$, the second predetermined value $T_2$, the threshold value $T_3$, and the predetermined amount $T_4$ are not limited to fixed value and can be adjusted according to different image characteristics to reach better noise reduction efficiency. The frame amount of the several previous frames K1 and the frame amount of the several following frames k2 are not restricted to fixed value and can be adjusted depending on user's demand and practical application. Furthermore, the 5×5 size of the motion window in the embodiment of the present invention is a preferred example only and the present invention is not intended to be restricted to this only to this size, but also extends to a motion window of other sizes.

In conclusion, the present invention provides a method using miscellaneous filters to reduce noise according to results of judgment. The trimmed mean filter performs well when dealing with the salt noise but not with the pepper noise. It also works well when dealing with noises of other types, for example, the Gaussian noise. In the approach of the present invention, the trimmed mean filter is used for filtering the Gaussian noise with low variance. The weighted arithmetic mean filter is used for filtering the Gaussian noise with high variance. The alpha-trimmed mean filter is useful in conditions involved in multiform noises (such as combination of pepper noise or Gaussian noise). In the approach of the present invention, the alpha-trimmed mean filter is used for filtering the Gaussian noise and the impulse noise that have few pixel amount of pixels that are similar to the center pixel in the motion window. The median filter is very popular due to providing perfect noise reduction capability to certain kinds of random noise and generating clearer images than linear smooth filters with the same size. The median filter performs well especially when dipole impulse noises and single pole impulse noises appear at the same time. In the approach of the present invention, the median filter is used for filtering fixed-value impulse noises. Because each filter has a different filtering effect in the light of different noises, expected filtering effect cannot be reached under some conditions if only one kind of filter is used to filter noise. The present invention provides a temporal weighted mean filter to derive better effects due to considering temporal relationship to reduce noise in temporal domain. Additionally, adjacencies and similarities are used for determining whether there is interference by noise or not. After that, area image characteristics is used for restoring the original pixel value interfered by noise to protect image detail parts and reach the goal of reducing video noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video noise reduction method using adaptive spatial and motion-compensation temporal filters, the method comprising:

calculating a mean of a plurality of pixels of a motion window;

calculating a pixel amount of pixels that are similar to a center pixel in the motion window;

calculating a variance of the plurality of pixels of the motion window;

determining whether a difference between a pixel value of the center pixel and the mean is greater than a first predetermined value;

determining whether the pixel amount of pixels that are similar to the center pixel in the motion window is greater than a second predetermined value if the difference between the pixel value of the center pixel and the mean is not greater than the first predetermined value;

determining whether the variance is smaller than a threshold value if the pixel amount of pixels that are similar to the center pixel in the motion window is not greater than the second predetermined value;

filtering the center pixel of the motion window according to a result of determining whether the variance is smaller than the threshold value; and using a temporal weighted mean filter involving motion estimation for motion compensation in images.

2. The video noise reduction method of claim 1 wherein the step of filtering the center pixel of the motion window according to the result of determining whether the variance is smaller than the threshold value comprises:

using a trimmed mean filter to filter the center pixel of the motion window if the variance is smaller than the threshold value.

3. The video noise reduction method of claim 1 wherein the step of filtering the center pixel of the motion window according to the result of determining whether the variance is smaller than the threshold value comprises:

using a weighted arithmetic mean filter to filter the center pixel of the motion window if the variance is not smaller than the threshold value.

4. The video noise reduction method of claim 1 further comprising:

using a median filter to filter the center pixel of the motion window if the difference between the pixel value of the center pixel and the mean is greater than the first predetermined value.

5. The video noise reduction method of claim 1 further comprising:

using an alpha-trimmed mean filter to filter the center pixel of the motion window if the pixel amount of pixels that are similar to the center pixel in the motion window is greater than the second predetermined value.

6. The video noise reduction method of claim 1 wherein the step of using a temporal weighted mean filter involving motion estimation for motion compensation in images comprises:

filtering a current frame including the motion window to generate a filtered frame;

estimating motion vectors of the moving objects of the current frame in several previous frames before the current frame according to the filtered frame and the several previous frames before the current frame;

estimating motion vectors of the moving objects of the current frame in several following frames after the current frame according to the filtered frame and the several following frames after the current frame; and removing residual images of the filtered frame according to the motion vectors of the moving objects of the current frame in the several previous frames, the motion vectors of the moving objects of the current frame in the several following frames, and the filtered frame.

7. The video noise reduction method of claim 6 wherein the step of removing residual images of the filtered frame according to the motion vectors of the moving objects of the current frame in the several previous frames, the motion vectors of the moving objects of the current frame in the several following frames, and the filtered frame is expressed as:

$$Y = \frac{1}{2+k1+k2}\left(2*xi + \sum_{j=1}^{k1} x_{i-j} + \sum_{j=1}^{k2} x_{i+j}\right);$$

wherein

Y is a pixel value of a center pixel of the filtered frame after removing residual images, K1 is a frame amount of the several previous frames, K2 is a frame amount of the several following frames, $X_i$ is the pixel value of the center pixel of the filtered frame before removing residual images, $X_{i-j}$ is the pixel value of the center pixel of the several previous frames, and $X_{i+j}$ is the pixel value of the center pixel of the several following frames.

* * * * *